United States Patent

Kobayashi

[11] 4,173,395
[45] Nov. 6, 1979

[54] WIDE ANGLE RETROFOCUS LENS SYSTEM

[75] Inventor: Koichi Kobayashi, Tokyo, Japan

[73] Assignee: Asahi Kogaku Kogyo Kabushiki Kaisha, Tokyo, Japan

[21] Appl. No.: 891,360

[22] Filed: Mar. 29, 1978

[30] Foreign Application Priority Data

Apr. 2, 1977 [JP] Japan .................... 52/37995

[51] Int. Cl.² ............................................. G02B 9/64
[52] U.S. Cl. ...................... 350/214; 350/176
[58] Field of Search ..................... 350/214, 176

[56] References Cited

U.S. PATENT DOCUMENTS 3,740,120  6/1973  Rühl ......................... 350/214
4,111,558  9/1978  Ikemori .................... 350/214 X

*Primary Examiner*—Paul A. Sacher
*Attorney, Agent, or Firm*—Sughrue, Rothwell, Mion, Zinn and Macpeak

[57] ABSTRACT

A wide angle retrofocus lens system comprises, in order from the object side to the image side, a first negative meniscus lens having a convex surface facing the object, a second positive double convex lens, a third negative meniscus lens having a convex surface facing the object, a fourth either positive or negative meniscus lens having a concave surface facing the object, a fifth either positive meniscus lens having a convex surface facing the object or positive double convex lens, a sixth negative lens, a seventh positive meniscus lens having a concave surface facing the object, and an eighth lens unit comprising a double concave lens on the object side and a double convex lens on the image side cemented together to form a positive lens. The overall lens system satisfies the following conditions:

$$0.8f < \sum_{i=1}^{7} d_i < 1.2f, \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i\, 0.52f, \text{ and} \quad (4)$$

$$0.13 < f/|r_4| < 0.25, \text{ where } r_4 < 0, \quad (5)$$

wherein:
  f is the focal distance of the overall lens system,
  $f_i$ is the resultant focal distance of the first through the i-th lens surfaces,
  $r_i$ is the radius of curvature of the i-th refracting surface, and
  $d_i$ is the spacing between the i-th lens surface and the (i+1)-th lens surface.

5 Claims, 10 Drawing Figures

SPHERICAL   CHROMATIC  ASTIGMATISM
ABERRATION  ABERRATION                DISTORTION
SINE
CONDITION

WIDE ANGLE RETROFOCUS LENS SYSTEM

BACKGROUND OF THE INVENTION

This invention relates to a retrofocus wide angle photographic lens system having an aperture ratio of 1:3.5–4.0 and a field angle of ±40°. The lens system of the invention successfully maintains a sufficient back focal length of 1.3–1.4 times the focal distance and efficiently provides for the correction of various types of aberrations.

DETAILED DESCRIPTION OF THE PREFERRED EMBODIMENTS

Figure 1A:
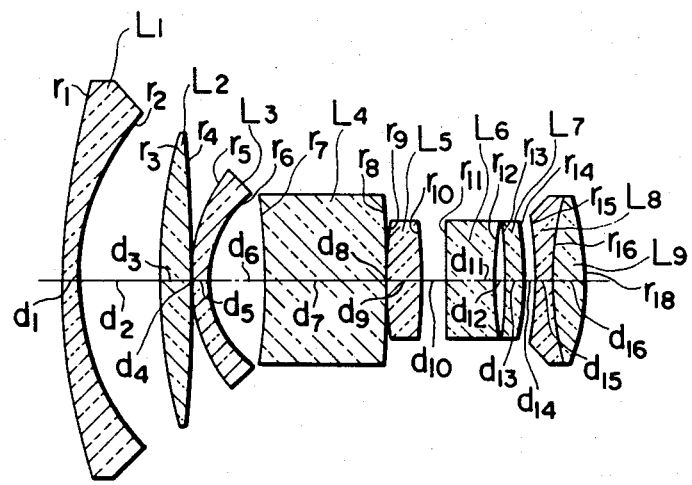
FIGS. 1(A), 2(A), 3(A), 4(A) and 5(A) show simplified longitudinal sectional views of retrofocus lens systems according to five specific examples of the present invention.

The lens system according to the present ivention comprises nine lenses grouped in eight lens components. In order, from the object side to the image side, the first lens component is a negative meniscus lens having a convex surface facing the object, the second lens component is positive double convex lens, the third lens component is a negative meniscus lens having a convex surface facing the object, the fourth lens component is either a positive or a negative meniscus lens having a concave surface facing the object, the fifth lens component is either a positive meniscus lens having a convex surface facing the object or a positive double convex lens, the sixth lens component is a negative lens, the seventh lens component is a positive meniscus lens having a concave surface facing the object, and the eighth lens component comprises a double concave lens on the object side and a double convex lens on the image side cemented together to form a positive lens. The overall lens system must satisfy the following five conditions, which will be described in greater detail below:

$$0.8f < \sum_{i=1}^{7} d_i < 1.2f \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i < 0.52f, \text{ and} \quad (4)$$

$$0.13 < f/|r_4| < 0.25, \text{ where } r_4 < 0, \quad (5)$$

wherein:

f is the focal distance of the overall lens system, $f_i$ is the resultant focal distance of the first through the i-th lens surfaces, $r_i$ is the radius of curvature of the i-th refracting surface, and $d_i$ is the spacing between the i-th lens surface and the (i+1)-th lens surface.

In this specification, the power of each lens will be expressed in values relative to the power of the overall lens system.

A retrofocus lens system, as is well known, is an optical system in which a positive power lens system is disposed at an appropriate interval after a negative power lens system. In the present invention, in order to maintain the back focal length sufficiently long and decrease the Petzval's sum, the resultant power of the partial lens system comprising the first through the eighth lens surfaces is negative, the absolute value of such resultant lens power is greater than 0.28, and the overall length of such partial lens system, that is $$\sum_{i=1}^{7} d_i,$$

is greater than 0.8 f. These limitations are shown on the left side of conditions (1) and (2) above. When $$\sum_{i=1}^{7} d_i$$

exceeds 1.2 f, however, the front or object side and the overall length of the lens system become too great, and this leads to inconvenience in use and handling. To prevent this the limitation on the right side of condition (1) is established. Also, when the resultant power of the partial lens system comprising the first through the eighth lens surfaces (lenses $L_1$–$L_4$) is more than 0.76, extreme negative distortion is caused and the Petzval's sum decreases excessively.

With respect to condition (3), if a thick lens having a weak power is disposed between the sixth and the ninth lens surfaces, when light beams enter at an angle to the optical axis toward the peripheral portions of the front lens, the height of the light incident upon the front portion of the lens system or its distance from the optical axis can be kept at a low value, which results in a smaller diameter for the front lens group ahead of the sixth lens surface. Thus, if $d_7$ is more than 0.34 f it is possible to decrease the diameter of such front lens group and to simultaneously obtain a sufficiently long back focal length. When $d_7$ exceeds the upper limit of 0.65 f, however, the Petzval's sum decreases excessively and the overall length of the lens system increases.

With respect to condition (4), when the distance between the ninth and the fourteenth surfaces, that is $$\sum_{i=9}^{13} d_i,$$

is smaller than 0.35 f, the image plane has a negative curvature. Conversely, when $$\sum_{i=9}^{13} d_i$$

exceeds 0.52 f, the image plane has a positive curvature.

With respect to condition (5), since negative distortion is compensated by the fourth refracting surface which as a negative curvature, when $f/|r_4|$ is smaller than the lower limit of 0.13, such distortion compensation becomes insufficient. Conversely, when $f/|r_4|$ exceeds the upper limit of 0.25, the distortion compensation becomes excessive.

Figure 1B:
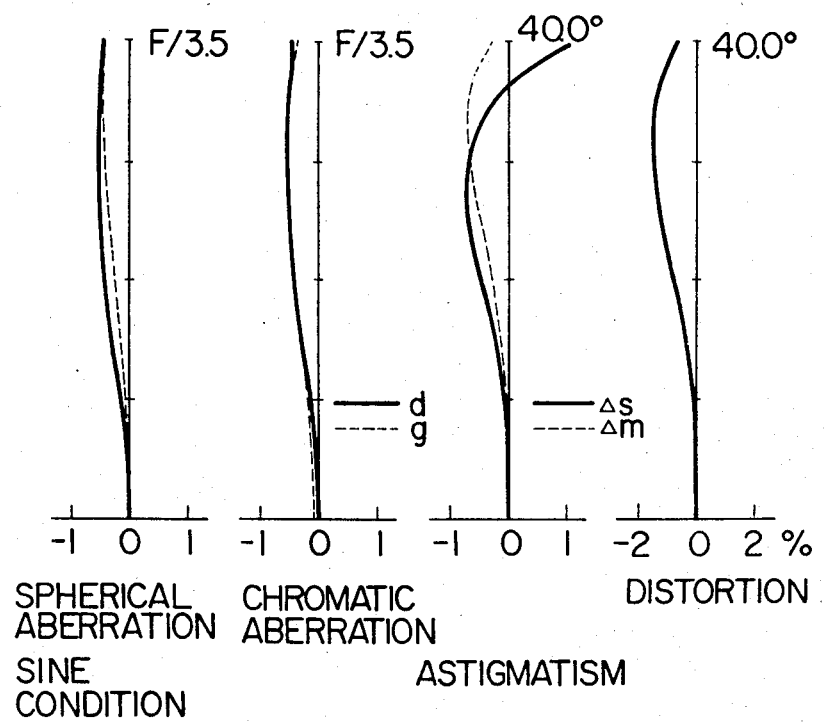
FIGS. 1(B), 2(B), 3(B), 4(B) and 5(B) show various aberration curve plots respectively corresponding to the lens systems shown in FIGS. 1(A), 2(A), 3(A), 4(A) and 5(A).
Figure 2A:
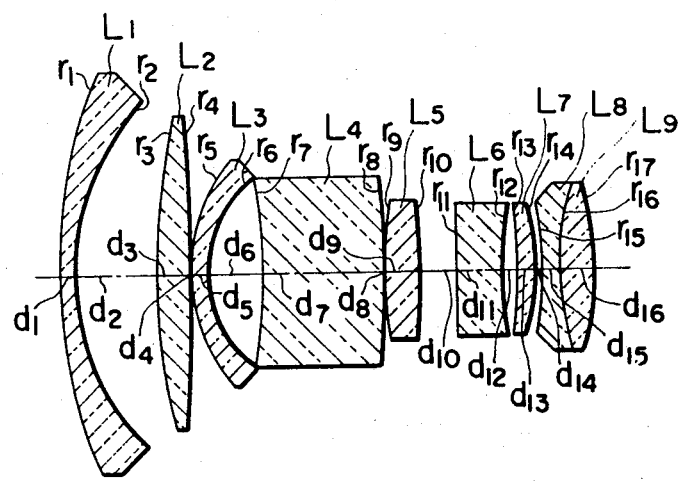
Figure 2B:
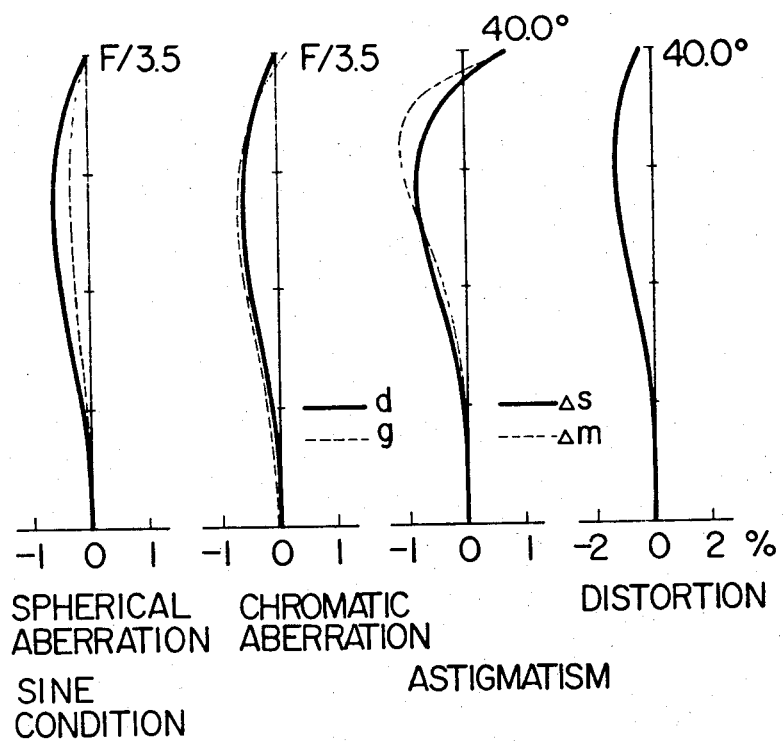
Figure 3A:
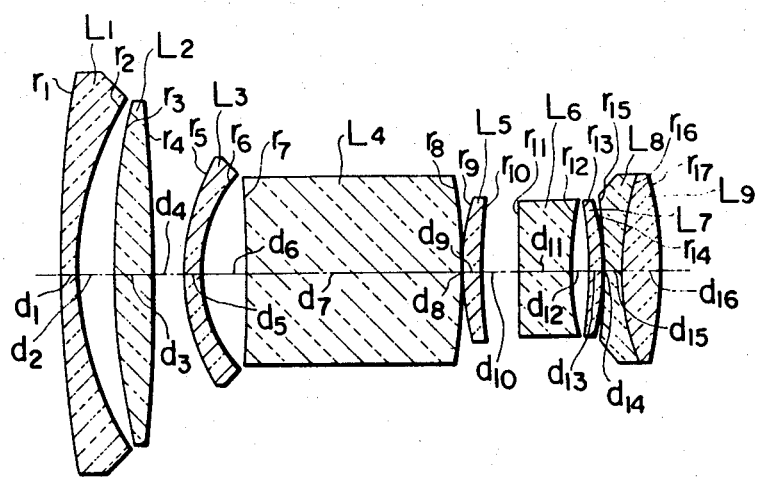
Figure 3B:
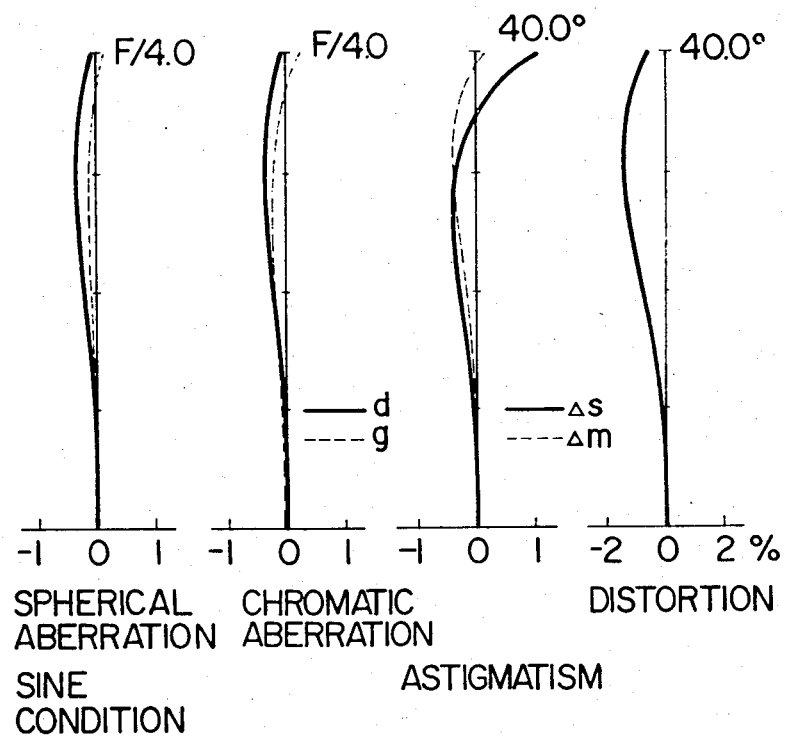
Figure 4A:
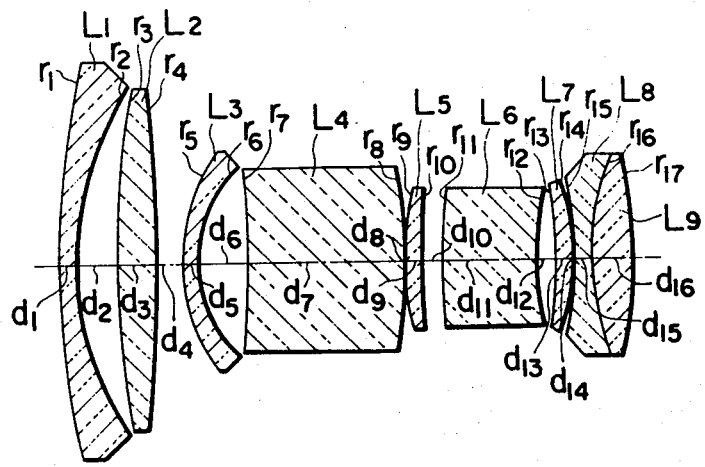
Figure 4B:
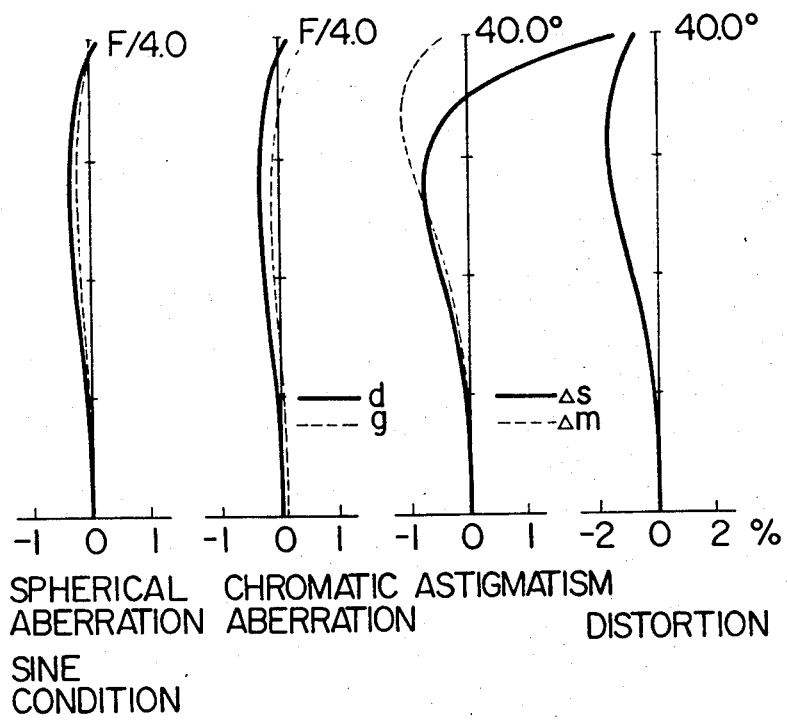
Figure 5A:
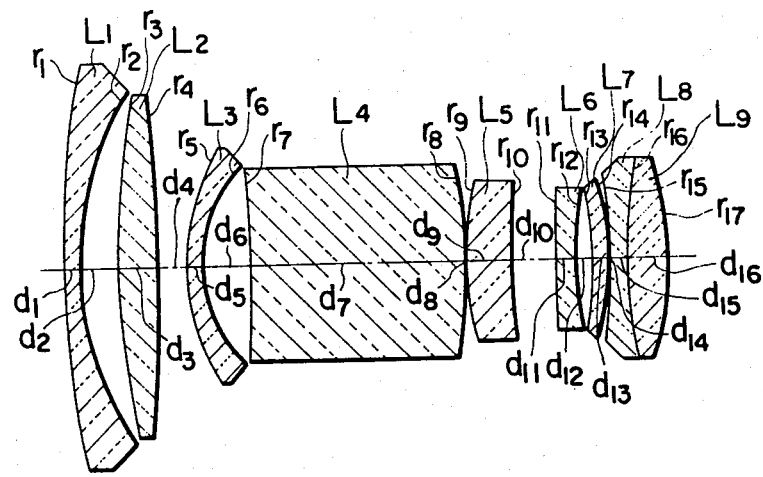
Figure 5B:
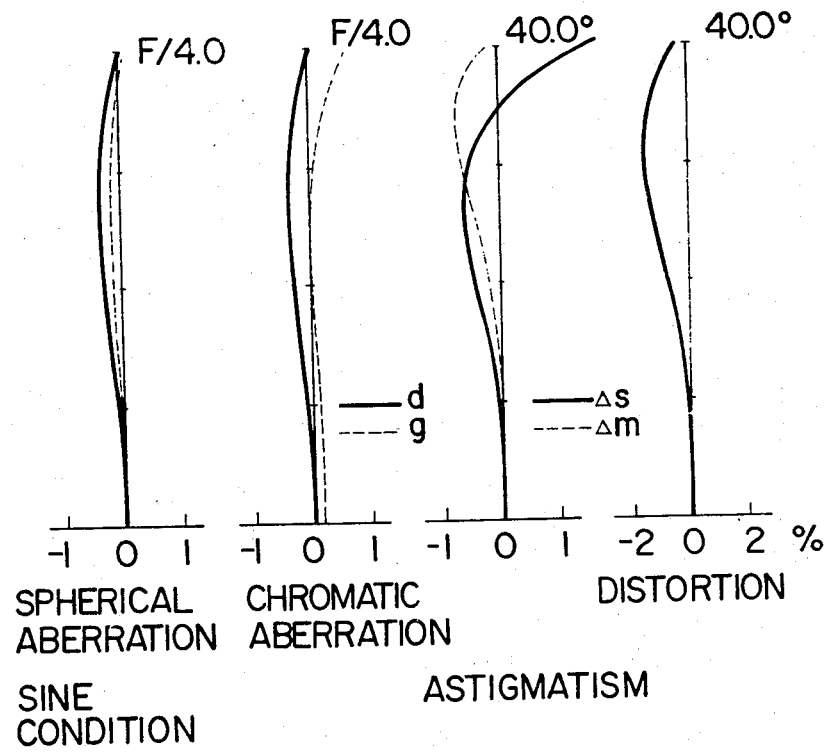

Detailed parameters for the five lens systems shown in FIGS. 1-5 are respectively listed in Examples 1-5 below, and the Seidal aberration coefficients for these examples are respectively listed in Tables 1-5 below. In the Examples and Tables:

$f_b$ is the back focal length,
N is the refractive index,
$\nu$ is the Abbé number,
EP is the position of the entrance pupil,
$S_1$ is the spherical aberration coefficient,
$S_2$ is the coma aberration coefficient,
$S_3$ is the distortion coefficient,
$S_5$ is the astigmatism coefficient, and
P is the Petzval sum.

The lens data given in Examples 1-5 below are for a lens system having a resultant focal distance f=100.0.

EXAMPLE 1

| | r | d | N/$\nu$ |
|---|---|---|---|
| | 1 : 3.5, $f_b$ = 134.71, f/$f_8$ = −0.689 | | |
| $L_1$ | $r_1$ = 207.46 | $d_1$ = 5.36 | $n_1$ = 1.51633/$\nu_1$ = 64.1 |
| | $r_2$ = 76.973 | $d_2$ = 25.89 | |
| $L_2$ | $r_3$ = 168.06 | $d_3$ = 9.82 | $n_2$ = 1.58913/$\nu_2$ = 61.1 |
| | $r_4$ = −656.53 | $d_4$ = 0.18 | |
| $L_3$ | $r_5$ = 57.78 | $d_5$ = 5.71 | $n_3$ = 1.51633/$\nu_3$ = 64.1 |
| | $r_6$ = 34.36 | $d_6$ = 17.86 | |
| $L_4$ | $r_7$ = −234.66 | $d_7$ = 38.39 | $n_4$ = 1.51112/$\nu_4$ = 60.5 |
| | $r_8$ = −654.36 | $d_8$ = 0.36 | |
| $L_5$ | $r_9$ = 119.40 | $d_9$ = 10.71 | $n_5$ = 1.83400/$\nu_5$ = 37.3 |
| | $r_{10}$ = −302.61 | $d_{10}$ = 9.93 | |
| $L_6$ | $r_{11}$ = −412.48 | $d_{11}$ = 14.71 | $n_6$ = 1.74077/$\nu_6$ = 27.8 |
| | $r_{12}$ = 93.34 | $d_{12}$ = 4.11 | |
| $L_7$ | $r_{13}$ = −163.29 | $d_{13}$ = 5.07 | $n_7$ = 1.80440/$\nu_7$ = 39.6 |
| | $r_{14}$ = −74.33 | $d_{14}$ = 3.21 | |
| $L_8$ | $r_{15}$ = −146.40 | $d_{15}$ = 5.36 | $n_8$ = 1.64769/$\nu_8$ = 33.8 |
| | $r_{16}$ = 89.19 | $d_{16}$ = 10.71 | $n_9$ = 1.69680/$\nu_9$ = 55.5 |
| $L_9$ | $r_{17}$ = −71.99 | | |

EXAMPLE 2

| | r | d | N/$\nu$ |
|---|---|---|---|
| | 1 : 3.5, $f_b$ = 134.59, f/$f_8$ = −0.678 | | |
| $L_1$ | $r_1$ = 156.38 | $d_1$ = 5.36 | $n_1$ = 1.58913/$\nu_1$ = 61.1 |
| | $r_2$ = 74.059 | $d_2$ = 25.37 | |
| $L_2$ | $r_3$ = 192.96 | $d_3$ = 10.72 | $n_2$ = 1.62041/$\nu_2$ = 60.3 |
| | $r_4$ = −679.98 | $d_4$ = 0.18 | |
| $L_3$ | $r_5$ = 53.272 | $d_5$ = 4.82 | $n_3$ = 1.62041/$\nu_3$ = 60.3 |
| | $r_6$ = 34.840 | $d_6$ = 17.87 | |
| | $r_7$ = −170.094 | | $n_4$ = 1.49782/$\nu_4$ = 66.8 |

-continued

| | r | d | N/$\nu$ |
|---|---|---|---|
| | 1 : 3.5, $f_b$ = 134.59, f/$f_8$ = −0.678 | | |
| $L_4$ | | $d_7$ = 38.41 | |
| | $r_8$ = −308.920 | $d_8$ = 0.36 | |
| $L_5$ | $r_9$ = 138.290 | $d_9$ = 10.72 | $n_5$ = 1.83400/$\nu_5$ = 37.2 |
| | $r_{10}$ = −319.709 | $d_{10}$ = 12.51 | |
| $L_6$ | $r_{11}$ = −768.567 | $d_{11}$ = 14.58 | $n_6$ = 1.74077/$\nu_6$ = 27.8 |
| | $r_{12}$ = 98.267 | $d_{12}$ = 4.11 | |
| $L_7$ | $r_{13}$ = −209.93 | $d_{13}$ = 6.07 | $n_7$ = 1.80610/$\nu_7$ = 40.9 |
| | $r_{14}$ = −65.027 | $d_{14}$ = 2.50 | |
| $L_8$ | $r_{15}$ = −104.49 | $d_{15}$ = 5.36 | $n_8$ = 1.67270/$\nu_8$ = 32.1 |
| $L_9$ | $r_{16}$ = 84.689 | $d_{16}$ = 10.72 | $n_9$ = 1.73500/$\nu_9$ = 49.8 |
| | $r_{17}$ = −84.716 | | |

EXAMPLE 3

| | r | d | N/$\nu$ |
|---|---|---|---|
| | 1 : 4.0, $f_b$ = 135.94, f/$f_8$ = −0.311 | | |
| $L_1$ | $r_1$ = 337.75 | $d_1$ = 4.73 | $n_1$ = 1.62280/$\nu_1$ = 57.0 |
| | $r_2$ = 84.69 | $d_2$ = 9.82 | |
| $L_2$ | $r_3$ = 205.10 | $d_3$ = 10.79 | $n_2$ = 1.62041/$\nu_2$ = 60.3 |
| | $r_4$ = −474.77 | $d_4$ = 8.93 | |
| $L_3$ | $r_5$ = 60.119 | $d_5$ = 4.29 | $n_3$ = 1.67003/$\nu_3$ = 47.3 |
| | $r_6$ = 37.498 | $d_6$ = 12.95 | |
| $L_4$ | $r_7$ = −436.100 | $d_7$ = 59.36 | $n_4$ = 1.60311/$\nu_4$ = 60.7 |
| | $r_8$ = −147.118 | $d_8$ = 0.18 | |
| $L_5$ | $r_9$ = 76.025 | $d_9$ = 5.98 | $n_5$ = 1.80518/$\nu_5$ = 25.4 |
| | $r_{10}$ = 262.36 | $d_{10}$ = 9.54 | |
| $L_6$ | $r_{11}$ = 2040.42 | $d_{11}$ = 14.82 | $n_6$ = 1.80518/$\nu_6$ = 25.4 |
| | $r_{12}$ = 74.47 | $d_{12}$ = 4.39 | |
| $L_7$ | $r_{13}$ = −112.54 | $d_{13}$ = 4.20 | $n_7$ = 1.77250/$\nu_7$ = 49.6 |
| | $r_{14}$ = −58.937 | $d_{14}$ = 0.18 | |
| $L_8$ | $r_{15}$ = −152.35 | $d_{15}$ = 4.46 | $n_8$ = 1.64769/$\nu_8$ = 33.8 |
| $L_9$ | $r_{16}$ = 68.328 | $d_{16}$ = 11.43 | $n_9$ = 1.72600/$\nu_9$ = 53.4 |
| | $r_{17}$ = −91.502 | | |

EXAMPLE 4

| | r | d | N/$\nu$ |
|---|---|---|---|
| | 1 : 4.0, $f_b$ = 129.59, f/$f_8$ = −0.427 | | |
| $L_1$ | $r_1$ = 232.77 | $d_1$ = 4.74 | $n_1$ = 1.62280/$\nu_1$ = 57.0 |
| | $r_2$ = 79.985 | $d_2$ = 10.73 | |
| $L_2$ | $r_3$ = 240.46 | $d_3$ = 10.39 | $n_2$ = 1.62041/$\nu_2$ = 60.3 |
| | $r_4$ = −452.66 | $d_4$ = 6.98 | |
| | $r_5$ = 47.913 | | $n_3$ = 1.67003/$\nu_3$ = 47.3 |

-continued

| | | 1 : 4.0, $f_b$ = 129.59, $f/f_8$ = −0.427 | |
|---|---|---|---|
| | r | d | N/ν |
| $L_3$ | | $d_5$ = 4.29 | |
| | $r_6$ = 32.783 | | |
| | | $d_6$ = 13.68 | |
| $L_4$ | $r_7$ = −265.06 | | $n_4$ = 1.60881/$ν_4$ = 58.9 |
| | | $d_7$ = 42.07 | |
| | $r_8$ = −156.27 | | |
| | | $d_8$ = 0.18 | |
| $L_5$ | $r_9$ = 78.02 | | $n_5$ = 1.80518/$ν_5$ = 25.4 |
| | | $d_9$ = 4.85 | |
| | $r_{10}$ = 229.25 | | |
| | | $d_{10}$ = 5.97 | |
| $L_6$ | $r_{11}$ = 961.07 | | $n_6$ = 1.80518/$ν_6$ = 25.4 |
| | | $d_{11}$ = 25.00 | |
| | $r_{12}$ = 78.88 | | |
| | | $d_{12}$ = 4.4 | |
| $L_7$ | $r_{13}$ = −148.96 | | $n_7$ = 1.81600/$ν_7$ = 46.6 |
| | | $d_{13}$ = 5.37 | |
| | $r_{14}$ = −52.33 | | |
| | | $d_{14}$ = 0.18 | |
| $L_8$ | $r_{15}$ = −103.47 | | $n_8$ = 1.64769/$ν_8$ = 33.8 |
| | | $d_{15}$ = 4.47 | |
| | $r_{16}$ = 64.743 | | |
| $L_9$ | | $d_{16}$ = 11.09 | $n_9$ = 1.75500/$ν_9$ = 52.3 |
| | $r_{17}$ = −110.345 | | |

EXAMPLE 5

| | | 1 : 4.0, $f_b$ = 141.34, $f/f_8$ = −0.349 | |
|---|---|---|---|
| | r | d | N/ν |
| $L_1$ | $r_1$ = 262.30 | | $n_1$ = 1.62299/$ν_1$ = 58.2 |
| | | $d_1$ = 4.73 | |
| | $r_2$ = 80.19 | | |
| | | $d_2$ = 9.82 | |
| $L_2$ | $r_3$ = 204.72 | | $n_2$ = 1.60311/$ν_2$ = 60.7 |
| | | $d_3$ = 10.79 | |
| | $r_4$ = −473.56 | | |
| | | $d_4$ = 7.87 | |
| $L_3$ | $r_5$ = 56.65 | | $n_3$ = 1.67000/$ν_3$ = 51.6 |
| | | $d_5$ = 4.29 | |
| | $r_6$ = 35.67 | | |
| | | $d_6$ = 12.95 | |
| $L_4$ | $r_7$ = −265.70 | | $n_4$ = 1.62230/$ν_4$ = 53.2 |
| | | $d_7$ = 57.68 | |
| | $r_8$ = −135.19 | | |
| | | $d_8$ = 0.18 | |
| $L_5$ | $r_9$ = 81.42 | | $n_5$ = 1.80518/$ν_5$ = 25.4 |
| | | $d_9$ = 12.82 | |
| | $r_{10}$ = 274.08 | | |
| | | $d_{10}$ = 11.32 | |
| $L_6$ | $r_{11}$ = 553.57 | | $n_6$ = 1.92286/$ν_6$ = 20.9 |
| | | $d_{11}$ = 5.54 | |
| | $r_{12}$ = 82.24 | | |
| | | $d_{12}$ = 4.39 | |
| $L_7$ | $r_{13}$ = −108.55 | | $n_7$ = 1.80400/$ν_7$ = 46.6 |
| | | $d_{13}$ = 4.46 | |
| | $r_{14}$ = −64.26 | | |
| | | $d_{14}$ = 0.18 | |
| $L_8$ | $r_{15}$ = −144.48 | | $n_8$ = 1.64769/$ν_8$ = 33.8 |
| | | $d_{15}$ = 4.46 | |
| | $r_{16}$ = 121.51 | | |
| $L_9$ | | $d_{16}$ = 11.43 | $n_9$ = 1.72600/$ν_9$ = 53.4 |
| | $r_{17}$ = −77.26 | | |

Table 1

EP = 0.724

| | $S_1$ | $S_2$ | $S_3$ | P | $S_5$ |
|---|---|---|---|---|---|
| 1 | 0.025 | 0.034 | 0.046 | 0.164 | 0.284 |
| 2 | −1.508 | 0.145 | −0.014 | −0.442 | 0.044 |
| 3 | 0.508 | 0.203 | 0.081 | 0.221 | 0.121 |
| 4 | 0.005 | −0.021 | 0.089 | 0.056 | −0.618 |
| 5 | 1.446 | 0.140 | 0.014 | 0.589 | 0.058 |
| 6 | −13.998 | 1.484 | −0.157 | −0.991 | 0.122 |
| 7 | 0.001 | 0.010 | 0.164 | −0.144 | 0.341 |

Table 1-continued

EP = 0.724

| | $S_1$ | $S_2$ | $S_3$ | P | $S_5$ |
|---|---|---|---|---|---|
| 8 | −0.107 | −0.158 | −0.232 | 0.052 | −0.264 |
| 9 | 3.501 | 1.205 | 0.414 | 0.381 | 0.274 |
| 10 | 0.872 | −0.622 | 0.443 | 0.150 | −0.423 |
| 11 | −0.580 | 0.460 | −0.364 | −0.103 | 0.370 |
| 12 | −3.446 | −1.682 | −0.821 | −0.456 | −0.623 |
| 13 | 0.010 | −0.040 | 0.162 | −0.273 | 0.445 |
| 14 | 3.027 | −0.780 | 0.201 | 0.600 | −0.206 |
| 15 | −0.551 | 0.301 | −0.165 | −0.269 | 0.236 |
| 16 | 0.354 | 0.151 | 0.065 | 0.020 | 0.036 |
| 17 | 12.279 | −0.767 | 0.048 | 0.570 | −0.039 |
| Σ | 1.839 | 0.076 | −0.027 | 0.125 | 0.155 |

Table 2

EP = 0.735

| | $S_1$ | $S_2$ | $S_3$ | P | $S_5$ |
|---|---|---|---|---|---|
| 1 | 0.061 | 0.051 | 0.042 | 0.237 | 0.231 |
| 2 | −1.671 | 0.199 | −0.024 | −0.501 | 0.062 |
| 3 | 0.400 | 0.191 | 0.091 | 0.198 | 0.138 |
| 4 | 0.003 | −0.014 | 0.070 | 0.056 | −0.618 |
| 5 | 2.039 | 0.093 | 0.004 | 0.719 | 0.033 |
| 6 | −14.495 | 1.717 | −0.203 | −1.099 | 0.154 |
| 7 | 0.003 | −0.019 | 0.148 | −0.195 | 0.359 |
| 8 | −0.020 | −0.062 | −0.189 | 0.108 | −0.252 |
| 9 | 2.852 | 1.009 | 0.357 | 0.329 | 0.243 |
| 10 | 0.592 | −0.476 | 0.383 | 0.142 | −0.422 |
| 11 | −0.246 | 0.264 | −0.283 | −0.055 | 0.364 |
| 12 | −3.175 | −1.557 | −0.764 | −0.433 | −0.587 |
| 13 | 0.001 | −0.012 | 0.184 | −0.213 | 0.441 |
| 14 | 8.661 | −1.405 | 0.228 | 0.686 | −0.148 |
| 15 | −3.132 | 0.854 | −0.233 | −0.385 | 0.168 |
| 16 | 0.443 | 0.181 | 0.074 | 0.025 | 0.041 |
| 17 | 9.523 | −0.968 | 0.098 | 0.500 | −0.061 |
| Σ | 1.837 | 0.044 | −0.018 | 0.120 | 0.145 |

Table 3

EP = 0.651

| | $S_1$ | $S_2$ | $S_3$ | P | $S_5$ |
|---|---|---|---|---|---|
| 1 | 0.006 | 0.017 | 0.046 | 0.114 | 0.434 |
| 2 | −1.818 | 0.069 | −0.003 | −0.453 | 0.017 |
| 3 | 0.539 | 0.202 | 0.075 | 0.187 | 0.098 |
| 4 | 0 | 0 | 0.004 | 0.081 | −0.580 |
| 5 | 1.831 | 0.198 | 0.021 | 0.667 | 0.075 |
| 6 | −15.154 | 1.458 | −0.140 | −1.070 | 0.116 |
| 7 | 0.115 | 0.172 | 0.257 | −0.086 | 0.256 |
| 8 | 0.033 | −0.034 | 0.034 | 0.256 | −0.292 |
| 9 | 5.290 | 1.374 | 0.357 | 0.587 | 0.245 |
| 10 | 0.044 | −0.116 | 0.304 | −0.170 | −0.351 |
| 11 | −0.422 | 0.402 | −0.382 | 0.022 | 0.343 |
| 12 | −5.233 | −2.170 | −0.900 | −0.599 | −0.622 |
| 13 | 0.039 | −0.042 | 0.046 | −0.387 | 0.371 |
| 14 | 7.389 | −1.262 | 0.216 | 0.739 | −0.163 |
| 15 | −0.859 | 0.424 | −0.209 | −0.258 | 0.231 |
| 16 | 0.991 | 0.335 | 0.113 | 0.040 | 0.052 |
| 17 | 8.621 | −1.144 | 0.152 | 0.460 | −0.081 |
| Σ | 1.413 | −0.118 | −0.018 | 0.128 | 0.149 |

Table 4

EP = 0.591

| | $S_1$ | $S_2$ | $S_3$ | P | $S_5$ |
|---|---|---|---|---|---|
| 1 | 0.019 | 0.033 | 0.057 | 0.165 | 0.384 |
| 2 | −1.838 | −0.028 | 0 | −0.480 | −0.007 |
| 3 | 0.382 | 0.212 | 0.118 | 0.159 | 0.154 |
| 4 | 0 | 0 | −0.001 | 0.085 | −0.587 |
| 5 | 3.377 | 0.223 | 0.015 | 0.838 | 0.056 |
| 6 | −18.358 | 1.168 | −0.074 | −1.225 | 0.083 |
| 7 | 0.030 | 0.088 | 0.260 | −0.143 | 0.348 |
| 8 | −0.015 | 0.025 | −0.040 | 0.242 | −0.327 |
| 9 | 4.857 | 1.464 | 0.441 | 0.572 | 0.305 |
| 10 | 0.001 | 0.014 | 0.160 | −0.195 | −0.383 |
| 11 | −0.065 | 0.126 | −0.244 | 0.046 | 0.384 |
| 12 | −4.846 | −2.297 | −1.089 | −0.566 | −0.784 |

Table 4-continued

| | | EP = 0.591 | | | |
|---|---|---|---|---|---|
| | $S_1$ | $S_2$ | $S_3$ | P | $S_5$ |
| 13 | 0.014 | −0.048 | 0.166 | −0.302 | 0.467 |
| 14 | 14.745 | −1.340 | 0.122 | 0.859 | −0.089 |
| 15 | −3.762 | 0.905 | −0.218 | −0.380 | 0.144 |
| 16 | 1.130 | 0.443 | 0.174 | 0.057 | 0.091 |
| 17 | 5.883 | −0.889 | 0.134 | 0.390 | −0.079 |
| Σ | 1.575 | 0.099 | −0.020 | 0.124 | 0.159 |

Table 5

| | | EP = 0.654 | | | |
|---|---|---|---|---|---|
| | $S_1$ | $S_2$ | $S_3$ | P | $S_5$ |
| 1 | 0.013 | 0.026 | 0.051 | 0.146 | 0.388 |
| 2 | −1.947 | 0.111 | −0.006 | −0.479 | 0.028 |
| 3 | 0.509 | 0.196 | 0.075 | 0.184 | 0.100 |
| 4 | 0 | 0 | −0.003 | 0.079 | −0.576 |
| 5 | 2.132 | 0.157 | 0.012 | 0.708 | 0.053 |
| 6 | −16.899 | 1.957 | −0.227 | −1.125 | 0.156 |
| 7 | 0.053 | 0.119 | 0.267 | −0.144 | 0.276 |
| 8 | 0.042 | −0.039 | 0.036 | 0.284 | −0.295 |
| 9 | 5.137 | 1.236 | 0.297 | 0.548 | 0.203 |
| 10 | 0.022 | −0.076 | 0.265 | −0.163 | −0.356 |
| 11 | −0.146 | 0.221 | −0.333 | 0.087 | 0.372 |
| 12 | −4.748 | −1.912 | −0.770 | −0.584 | −0.545 |
| 13 | 0.042 | −0.041 | 0.040 | −0.411 | 0.364 |
| 14 | 5.107 | −1.134 | 0.252 | 0.694 | −0.210 |
| 15 | −0.655 | 0.353 | −0.191 | −0.272 | 0.250 |
| 16 | 0.324 | 0.134 | 0.055 | 0.023 | 0.032 |
| 17 | 12.561 | −1.447 | 0.167 | 0.544 | −0.082 |
| Σ | 1.547 | −0.142 | −0.012 | 0.120 | 0.157 |

The values of conditions (1)–(5) for the specific examples above are given in Table 6 below.

Table 6

| Conditions | Examples | 1 | 2 | 3 | 4 | 5 |
|---|---|---|---|---|---|---|
| (1) | | 1.03f | 1.03f | 1.11f | 0.93f | 1.08f |
| (2) | | 0.689 | 0.678 | 0.311 | 0.427 | 0.349 |
| (3) | | 0.38f | 0.38f | 0.59f | 0.42f | 0.58f |
| (4) | | 0.45f | 0.48f | 0.39f | 0.46f | 0.39f |
| (5) | | 0.152 | 0.147 | 0.211 | 0.221 | 0.211 |

What is claimed is:

1. A wide angle retrofocus lens system, comprising: nine lenses grouped in eight lens components in the following order from the object side to the image side, the first lens component being a negative meniscus lens having a convex surface facing the object, the second lens component being a positive double convex lens, the third lens component being a negative meniscus lens having a convex surface facing the object, the fourth lens component being either a positive or a negative meniscus lens having a concave surface facing the object, the fifth lens component being either a positive meniscus lens having a convex surface facing the object or a positive double convex lens, the sixth lens component being a negative lens, the seventh lens component being a positive meniscus lens having a concave surface facing the object, and the eighth lens component comprising a double concave lens on the object side and a double convex lens on the image side cemented together to form a positive lens, said lens system satisfying the following conditions:

$$0.8f < \sum_{i=1}^{7} d_i < 1.2f, \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i < 0.52f, \text{ and} \quad (4)$$

$$0.13 < f/|r_4| < 0.25, \text{ where } r_4 < 0, \quad (5)$$

wherein:
f is the focal distance of the overall lens system,
$f_i$ is the resultant focal distance of the first through the i-th lens surfaces,
$r_i$ is the radius of curvature of the i-th refracting surface, and
$d_i$ is the spacing between the i-th lens surface and the (i+1)-th lens surface, and wherein:

| 1 : 3.5, $f_b$ = 134.71, $f/f_8$ = −0.689 | | |
|---|---|---|
| r | d | N/ν |
| $L_1$ { $r_1$ = 207.46 | | $n_1$ = 1.51633/$v_1$ = 64.1 |
| | $d_1$ = 5.36 | |
| $r_2$ = 76.973 | | |
| | $d_2$ = 25.89 | |
| $L_2$ { $r_3$ = 168.06 | | $n_2$ = 1.58913/$v_2$ = 61.1 |
| | $d_3$ = 9.82 | |
| $r_4$ = 656.53 | | |
| | $d_4$ = 0.18 | |
| $L_3$ { $r_5$ = 57.78 | | $n_3$ = 1.51633/$v_3$ = 64.1 |
| | $d_5$ = 5.71 | |
| $r_6$ = 34.36 | | |
| | $d_6$ = 17.86 | |
| $L_4$ { $r_7$ = −234.66 | | $n_4$ = 1.51112/$v_4$ = 60.5 |
| | $d_7$ = 38.39 | |
| $r_8$ = −654.36 | | |
| | $d_8$ = 0.36 | |
| $L_5$ { $r_9$ = 119.40 | | $n_5$ = 1.83400/$v_5$ = 37.3 |
| | $d_9$ = 10.71 | |
| $r_{10}$ = −302.61 | | |
| | $d_{10}$ = 9.93 | |
| $L_6$ { $r_{11}$ = −412.48 | | $n_6$ = 1.74077/$v_6$ = 27.8 |
| | $d_{11}$ = 14.71 | |
| $r_{12}$ = 93.34 | | |
| | $d_{12}$ = 4.11 | |
| $L_7$ { $r_{13}$ = −163.29 | | $n_7$ = 1.80440/$v_7$ = 39.6 |
| | $d_{13}$ = 5.07 | |
| $r_{14}$ = −74.33 | | |
| | $d_{14}$ = 3.21 | |
| $L_8$ { $r_{15}$ = −146.40 | | $n_8$ = 1.64769/$v_8$ = 33.8 |
| | $d_{15}$ = 5.36 | |
| $r_{16}$ = 89.19 | | $n_9$ = 1.69680/$v_9$ = 55.5 |
| $L_9$ { | $d_{16}$ = 10.71 | |
| $r_{17}$ = −71.99, | | | wherein:
$L_i$ is the i-th lens from the object side,
$f_b$ is the back focal length,
N is the refractive index, and
$v$ is the Abbé number.

2. A wide angle retrofocus lens system, comprising: nine lenses grouped in eight lens components in the following order from the object side to the image side, the first lens component being a negative meniscus lens having a convex surface facing the object, the second lens component being a positive double convex lens, the third lens component being a negative meniscus lens having a convex surface facing the object, the fourth lens component being either a positive or a negative meniscus lens having a concave surface facing the object, the fifth lens component being either a positive meniscus lens having a convex surface facing the object or a positive double convex lens, the sixth lens component being a negative lens, the seventh lens component being a positive meniscus lens having a concave surface facing the object, and the eighth lens component comprising a double concave lens on the object side and a double convex lens on the image side cemented together to form a positive lens, said lens system satisfying the following conditions:

$$0.8f < \sum_{i=1}^{7} d_i < 1.2f, \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i < 0.52f, \text{ and} \quad (4)$$

$$0.13 < f/|r_4| < 0.25, \text{ where } r_4 < 0, \quad (5)$$

wherein:
f is the focal distance of the overall lens system,
$f_i$ is the resultant focal distance of the first through the i-th lens surfaces,
$r_i$ is the radius of curvature of the i-th refracting surface, and
$d_i$ is the spacing between the i-th lens surface and the (i+1)-th lens surface, and wherein:

| 1 : 3.5, $f_b$ = 134.59, f/$f_8$ = −0.678 | | |
|---|---|---|
| r | d | N/ν |
| $L_1$ { $r_1$ = 156.38 | $d_1$ = 5.36 | $n_1$ = 1.58913/$v_1$ = 61.1 |
| $r_2$ = 74.059 | $d_2$ = 25.37 | |
| $L_2$ { $r_3$ = 192.96 | $d_3$ = 10.72 | $n_2$ = 1.62041/$v_2$ = 60.3 |
| $r_4$ = −679.98 | $d_4$ = 0.18 | |
| $L_3$ { $r_5$ = 53.272 | $d_5$ = 4.82 | $n_3$ = 1.62041/$v_3$ = 60.3 |
| $r_6$ = 34.840 | $d_6$ = 17.87 | |
| $L_4$ { $r_7$ = −170.094 | $d_7$ = 38.41 | $n_4$ = 1.49782/$v_4$ = 66.8 |
| $r_8$ = −308.920 | $d_8$ = 0.36 | |
| $L_5$ { $r_9$ = 138.290 | $d_9$ = 10.72 | $n_5$ = 1.83400/$v_5$ = 37.2 |
| $r_{10}$ = −319.709 | $d_{10}$ = 12.51 | |
| $L_6$ { $r_{11}$ = −768.567 | $d_{11}$ = 14.58 | $n_6$ = 1.74077/$v_6$ = 27.8 |
| $r_{12}$ = 98.267 | $d_{12}$ = 4.11 | |
| $L_7$ { $r_{13}$ = −209.53 | $d_{13}$ = 6.07 | $n_7$ = 1.80610/$v_7$ = 40.9 |
| $r_{14}$ = −65.027 | $d_{14}$ = 2.50 | |
| $L_8$ { $r_{15}$ = −104.49 | $d_{15}$ = 5.36 | $n_8$ = 1.67270/$v_8$ = 32.1 |
| $L_9$ { $r_{16}$ = 84.689 | $d_{16}$ = 10.72 | $n_9$ = 1.73500/$v_9$ = 49.8 |
| $r_{17}$ = −84.716, | | | wherein:
$L_i$ is the i-th lens from the object side,
$f_b$ is the back focal length,
N is the refractive index, and
ν is the Abbé number.

3. A wide angle retrofocus lens system, comprising: nine lenses grouped in eight lens components in the following order from the object side to the image side, the first lens component being a negative meniscus lens having a convex surface facing the object, the second lens component being a positive double convex lens, the third lens component being a negative meniscus lens having a convex surface facing the object, the fourth lens component being either a positive or a negative meniscus lens having a concave surface facing the object, the fifth lens component being either a positive meniscus lens having a convex surface facing the object or a positive double convex lens, the sixth lens component being a negative lens, the seventh lens component being a positive meniscus lens having a concave surface facing the object, and the eighth lens component comprising a double concave lens on the object side and a double convex lens on the image side cemented together to form a positive lens, said lens system satisfying the following conditions:

$$0.8f < \sum_{i=1}^{7} d_i < 1.2f, \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i < 0.52f, \text{ and} \quad (4)$$

$$0.13 < f/|r_4| < 0.25, \text{ where } r_4 < 0, \quad (5)$$

wherein:
f is the focal distance of the overall lens system,
$f_i$ is the resultant focal distance of the first through the i-th lens surfaces,
$r_i$ is the radius of curvature of the i-th refracting surface, and
$d_i$ is the spacing between the i-th lens surface and the (i+1)-th lens surface, and wherein:

| 1 : 4.0, $f_b$ = 135.94, f/$f_8$ = −0.311 | | |
|---|---|---|
| r | d | N/ν |
| $L_1$ { $r_1$ = 337.75 | $d_1$ = 4.73 | $n_1$ = 1.62280/$v_1$ = 57.0 |
| $r_2$ = 84.69 | $d_2$ = 9.82 | |
| $L_2$ { $r_3$ = 205.10 | $d_3$ = 10.79 | $n_2$ = 1.62041/$v_2$ = 60.3 |
| $r_4$ = −474.77 | $d_4$ = 8.93 | |
| $L_3$ { $r_5$ = 60.119 | $d_5$ = 4.29 | $n_3$ = 1.67003/$v_3$ = 47.3 |
| $r_6$ = 37.498 | $d_6$ = 12.95 | |
| $L_4$ { $r_7$ = −436.100 | $d_7$ = 59.36 | $n_4$ = 1.60311/$v_4$ = 60.7 |
| $r_8$ = −147.118 | $d_8$ = 0.18 | |
| $L_5$ { $r_9$ = 76.025 | $d_9$ = 5.98 | $n_5$ = 1.80518/$v_5$ = 25.4 |
| $r_{10}$ = 262.36 | $d_{10}$ = 9.54 | |
| $L_6$ { $r_{11}$ = 2040.42 | $d_{11}$ = 14.82 | $n_6$ = 1.80518/$v_6$ = 25.4 |
| $r_{12}$ = 74.47 | $d_{12}$ = 4.39 | |
| $L_7$ { $r_{13}$ = −112.54 | $d_{13}$ = 4.20 | $n_7$ = 1.77250/$v_7$ = 49.6 |
| $r_{14}$ = −58.937 | $d_{14}$ = 0.18 | |
| $L_8$ { $r_{15}$ = −152.35 | $d_{15}$ = 4.46 | $n_8$ = 1.64769/$v_8$ = 33.8 |
| $r_{16}$ = 68.328 | | $n_9$ = 1.72600/$v_9$ = 53.4 |

-continued

| 1 : 4.0, $f_b$ = 135.94, $f/f_8$ = −0.311 | | |
|---|---|---|
| r | d | N/ν |
| $L_9$ { $r_{17}$ = −91.502, | $d_{16}$ = 11.43 | | wherein:
$L_i$ is the i-th lens from the object side,
$f_b$ is the back focal length,
N is the refractive index, and
ν is the Abbé number.

4. A wide angle retrofocus lens system, comprising: nine lenses grouped in eight lens components in the following order from the object side to the image side, the first lens component being a negative meniscus lens having a convex surface facing the object, the second lens component being a positive double convex lens, the third lens component being a negative meniscus lens having a convex surface facing the object, the fourth lens component being either a positive or a negative meniscus lens having a concave surface facing the object, the fifth lens component being either a positive meniscus lens having a convex surface facing the object or a positive double convex lens, the sixth lens component being a negative lens, the seventh lens component being a positive meniscus lens having a concave surface facing the object, and the eighth lens component comprising a double concave lens on the object side and a double convex lens on the image side cemented together to form a positive lens, said lens system satisfying the following conditions:

$$0.8f < \sum_{i=1}^{7} d_i < 1.2f, \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i < 0.52f, \text{ and} \quad (4)$$

$$0.13 < f/|r_4| < 0.25, \text{ where } r_4 < 0, \quad (5)$$

wherein:
f is the focal distance of the overall lens system,
$f_i$ is the resultant focal distance of the first through the i-th lens surfaces,
$r_i$ is the radius of curvature of the i-th refracting surface, and
$d_i$ is the spacing between the i-th lens surface and the (i+1)-th lens surface, and wherein:

| 1 : 4.0, $f_b$ = 129.59, $f/f_8$ = −0.427 | | |
|---|---|---|
| r | d | N/ν |
| $L_1$ { $r_1$ = 232.77<br>$r_2$ = 79.985 | $d_1$ = 4.74<br>$d_2$ = 10.73 | $n_1$ = 1.62280/$ν_1$ = 57.0 |
| $L_2$ { $r_3$ = 240.46<br>$r_4$ = −452.66 | $d_3$ = 10.39<br>$d_4$ = 6.98 | $n_2$ = 1.62041/$ν_2$ = 60.3 |
| $L_3$ { $r_5$ = 47.913<br>$r_6$ = 32.783 | $d_5$ = 4.29<br>$d_6$ = 13.68 | $n_3$ = 1.67003/$ν_3$ = 47.3 |
| $L_4$ { $r_7$ = −265.06<br>$r_8$ = −156.27 | $d_7$ = 42.07<br>$d_8$ = 0.18 | $n_4$ = 1.60881/$ν_4$ = 58.9 |
| $L_5$ { $r_9$ = 78.02<br>$r_{10}$ = 229.25 | $d_9$ = 4.85<br>$d_{10}$ = 5.97 | $n_5$ = 1.80518/$ν_5$ = 25.4 |
| $L_6$ { $r_{11}$ = 961.07<br>$r_{12}$ = 78.88 | $d_{11}$ = 25.00<br>$d_{12}$ = 4.4 | $n_6$ = 1.80518/$ν_6$ = 25.4 |
| $L_7$ { $r_{13}$ = −148.96<br>$r_{14}$ = −52.33 | $d_{13}$ = 5.37<br>$d_{14}$ = 0.18 | $n_7$ = 1.81600/$ν_7$ = 46.6 |
| $L_8$ { $r_{15}$ = −103.47<br>$r_{16}$ = 64.743 | $d_{15}$ = 4.47<br>$d_{16}$ = 11.09 | $n_8$ = 1.64769/$ν_8$ = 33.8 |
| $L_9$ { $r_{17}$ = −110.345, | | $n_9$ = 1.75500/$ν_9$ = 52.3 | wherein:
$L_i$ is the i-th lens from the object side,
$f_b$ is the back focal length,
N is the refractive index, and
ν is the Abbé number.

5. A wide angle retrofocus lens system, comprising: nine lenses grouped in eight lens components in the following order from the object side to the image side, the first lens component being a negative meniscus lens having a convex surface facing the object, the second lens component being a positive double convex lens, the third lens component being a negative meniscus lens having a convex surface facing the object, the fourth lens component being either a positive or a negative meniscus lens having a concave surface facing the object, the fifth lens component being either a positive meniscus lens having a convex surface facing the object or a positive double convex lens, the sixth lens component being a negative lens, the seventh lens component being a positive meniscus lens having a concave surface facing the object, and the eighth lens component comprising a double concave lens on the object side and a double convex lens on the image side cemented together to form a positive lens, said lens system satisfying the following conditions:

$$0.8f < \sum_{i=1}^{7} d_i < 1.2f, \quad (1)$$

$$0.28 < f/|f_8| < 0.76, \text{ where } f_8 < 0, \quad (2)$$

$$0.34f < d_7 < 0.65f, \quad (3)$$

$$0.35f < \sum_{i=9}^{13} d_i < 0.52f, \text{ and} \quad (4)$$

$$0.13 < f/|r_4| < 0.25, \text{ where } r_4 < 0, \quad (5)$$

wherein:
f is the focal distance of the overall lens system,
$f_i$ is the resultant focal distance of the first through the i-th lens surfaces,
$r_i$ is the radius of curvature of the i-th refracting surface, and $d_i$ is the spacing between the i-th lens surface and the (i+1)-th lens surface, and wherein:

| | 1 : 4.0, $f_b$ = 141.34, f/$f_8$ = −0.349 | | |
|---|---|---|---|
| | r | d | N/ν |
| $L_1$ | $r_1$ = 262.30 | | $n_1$ = 1.62299/$\nu_1$ = 58.2 |
| | | $d_1$ = 4.73 | |
| | $r_2$ = 80.19 | | |
| | | $d_2$ = 9.82 | |
| $L_2$ | $r_3$ = 204.72 | | $n_2$ = 1.60311/$\nu_2$ = 60.7 |
| | | $d_3$ = 10.79 | |
| | $r_4$ = −473.56 | | |
| | | $d_4$ = 7.87 | |
| $L_3$ | $r_5$ = 56.65 | | $n_3$ = 1.67000/$\nu_3$ = 51.6 |
| | | $d_5$ = 4.29 | |
| | $r_6$ = 35.67 | | |
| | | $d_6$ = 12.95 | |
| $L_4$ | $r_7$ = −265.70 | | $n_4$ = 1.62230/$\nu_4$ = 53.2 |
| | | $d_7$ = 57.68 | |
| | $r_8$ = −135.19 | | |
| | | $d_8$ = 0.18 | |
| | $r_9$ = 81.42 | | $n_5$ = 1.80518/$\nu_5$ = 25.4 |

-continued

| | 1 : 4.0, $f_b$ = 141.34, f/$f_8$ = −0.349 | | |
|---|---|---|---|
| | r | d | N/ν |
| $L_5$ | | $d_9$ = 12.82 | |
| | $r_{10}$ = 274.08 | | |
| | | $d_{10}$ = 11.32 | |
| $L_6$ | $r_{11}$ = 553.57 | | $n_6$ = 1.92286/$\nu_6$ = 20.9 |
| | | $d_{11}$ = 5.54 | |
| | $r_{12}$ = 82.24 | | |
| | | $d_{12}$ = 4.39 | |
| $L_7$ | $r_{13}$ = −108.55 | | $n_7$ = 1.80400/$\nu_7$ = 46.6 |
| | | $d_{13}$ = 4.46 | |
| | $r_{14}$ = −64.26 | | |
| | | $d_{14}$ = 0.18 | |
| $L_8$ | $r_{15}$ = −144.48 | | $n_8$ = 1.64769/$\nu_8$ = 33.8 |
| | | $d_{15}$ = 4.46 | |
| $L_9$ | $r_{16}$ = 121.51 | | $n_9$ = 1.72600/$\nu_9$ = 53.4 |
| | | $d_{16}$ = 11.43 | |
| | $r_{17}$ = −77.26, | | | wherein:
$L_i$ is the i-th lens from the object side,
$f_b$ is the back focal length,
N is the refractive index, and
ν is the Abbé number.

* * * * *